(12) United States Patent
Armstrong et al.

(10) Patent No.: US 7,413,687 B2
(45) Date of Patent: Aug. 19, 2008

(54) LOW TEMPERATURE PROTON CONDUCTING OXIDE DEVICES

(75) Inventors: Timothy R. Armstrong, Clinton, TN (US); Edward A. Payzant, Oak Ridge, TN (US); Scott A. Speakman, Oak Ridge, TN (US); Martha Greenblatt, Highland Park, NJ (US)

(73) Assignee: UT - Battelle, LLC, Oak Ridge, TN (US)

( * ) Notice: Subject to any disclaimer, the term of this patent is extended or adjusted under 35 U.S.C. 154(b) by 679 days.

(21) Appl. No.: 11/166,573

(22) Filed: Jun. 24, 2005

(65) Prior Publication Data

US 2006/0292416 A1   Dec. 28, 2006

(51) Int. Cl.
| | |
|---|---|
| C04B 35/01 | (2006.01) |
| H01M 8/24 | (2006.01) |
| C01G 57/00 | (2006.01) |
| C01F 17/00 | (2006.01) |
| B01D 53/22 | (2006.01) |

(52) U.S. Cl. .................. 252/518.1; 252/500; 252/520.2; 252/521.1; 252/521.2; 429/17; 429/30; 429/33; 429/40; 429/46; 423/594.13; 423/606; 204/421.4; 204/430; 204/295; 204/265; 95/54; 96/4; 96/11; 205/788; 205/783

(58) Field of Classification Search .............. 252/518.1, 252/500, 520.2, 521, 521.2; 429/17, 30, 429/33, 40, 46; 423/594.13, 606; 501/123, 501/125, 46; 204/265, 266, 260, 295, 421.4, 204/430; 95/54; 96/4, 11; 205/788, 753
See application file for complete search history.

(56) References Cited

U.S. PATENT DOCUMENTS

| | | | |
|---|---|---|---|
| 4,970,027 A | 11/1990 | Honda et al. | |
| 5,723,074 A | 3/1998 | Balachandran et al. | |
| 6,514,314 B2 | 2/2003 | Sirman et al. | |
| 7,018,566 B2 * | 3/2006 | Goutenoire et al. | ......... 252/500 |
| 2003/0160216 A1 | 8/2003 | Goutenoire et al. | |

OTHER PUBLICATIONS

Georges et al, "Thermal, structural and transport properties of the fast oxide-ion conductors La2-xRxMo2O9, (R=Nd,Gd, Y)," Solid State Ionics, 2003, V161, pp. 231-241.*

Lacorre et al, "New Oxide Ion Conductors based on La2Mo2O9," Abstract No. K-IX-1, Symposium-K, Solid state ionics: high temperature vs. low temperature defect chemistry, European Materials Research Socieety, Strasbourg, France, May 24-28, 2004.*

Goutenoire et al, "Structural and transport characteristics of the LAMOX family of fast-ion conductors, based on lantanum molybdenum oxide La2Mo2O9," J. Matl. Chem. 2001, 11, 119-124.*

Lacorre et al, "Designing fast oxide-ion conductors based on La2Mo2O9," Nature, 2000, V404, 856-858.*

P. Lacorre, et al., "Designing fast oxide-ion conductors based on La2Mo2O9," Nature, 2000, pp. 856-858, vol. 404.

* cited by examiner

Primary Examiner—Stuart Hendrickson
Assistant Examiner—Kallambella Vijayakumar
(74) Attorney, Agent, or Firm—Joseph A. Marasco

(57) ABSTRACT

A device for conducting protons at a temperature below 550° C. includes a LAMOX ceramic body characterized by an alpha crystalline structure.

9 Claims, 2 Drawing Sheets

LOW TEMPERATURE PROTON CONDUCTING OXIDE DEVICES

The United States Government has rights in this invention pursuant to contract no. DE-AC05-00OR22725 between the United States Department of Energy and UT-Battelle, LLC.

FIELD OF THE INVENTION

The present invention relates to proton conducting oxide devices, and more particularly to stable proton conducting oxide devices that exhibit proton conductivity at temperatures below 550° C.

BACKGROUND OF THE INVENTION

Ion transport membranes composed of proton conducting materials are a critical component for: future fuel processing such as separations, for example; energy production systems such as fuel cells, for example; and ancillary technologies such as sensors and electrolyzers for example.

Ceramic oxide hydrogen ion transport membranes ("proton conductors") are presently limited in availability and performance. Presently known hydrogen ion conductors are characterized by low conductivities, lack of stability in reducing environments and/or susceptibility to chemical attack by contaminants such as sulfur ($H_2S$) and $CO_2$.

Incorporated herein by reference is the entire disclosure of U.S. Patent Application No. 20030160216 published Aug. 28, 2003, PCT filed Apr. 5, 2001 by Francois Goutenoire, at al.

OBJECTS OF THE INVENTION

Accordingly, objects of the present invention include provision of stable proton conducting oxide devices that exhibit proton conductivity at temperatures below 550° C. Further and other objects of the present invention will become apparent from the description contained herein.

SUMMARY OF THE INVENTION

In accordance with one aspect of the present invention, the foregoing and other objects are achieved by a device for conducting protons at a temperature below 550° C. includes a ceramic body having a chemical formula:

$A_{2-x}A'_xB_{2-y}B'_yO_{9-\delta}$ wherein:

A is essentially composed of at least one trivalent element selected from the group consisting of lanthanum, cerium, praseodymium, neodymium, promethium, samarium, europium, gadolinium, terbium, dysprosium, holmium, erbium, thulium, ytterbium, lutetium, actinium, thorium, protactinium, uranium, bismuth, antimony, and arsenic;

A' is essentially composed of at least one element selected from the group consisting of monovalent lithium, monovalent sodium, monovalent potassium, monovalent rubidium, monovalent cesium, monovalent francium, divalent beryllium, divalent magnesium, divalent calcium, divalent strontium, divalent barium, divalent radium, divalent tin, divalent lead, divalent samarium, divalent europium, divalent erbium, divalent thulium divalent ytterbium, quadrivalent thorium, quadrivalent uranium, quadrivalent titanium, quadrivalent zirconium, quadrivalent hafnium, quadrivalent thorium, quadrivalent cerium, quadrivalent praseodymium, and quadrivalent terbium;

B is essentially composed of at least one element selected from the group consisting of hexavalent chromium, hexavalent molybdenum, hexavalent tungsten, hexavalent uranium, hexavalent manganese, hexavalent technetium, hexavalent rhenium, hexavalent iron, hexavalent cobalt, hexavalent nickel, hexavalent ruthenium, hexavalent rhodium, hexavalent palladium, hexavalent osmium, hexavalent iridium, hexavalent platinum, hexavalent sulfur, hexavalent selenium, hexavalent tellurium, and hexavalent polonium;

B' is essentially composed of at least one element selected from the group consisting of lithium, sodium, magnesium, calcium, scandium, yttrium, europium, gadolinium, terbium, dysprosium, holmium, erbium, thulium, ytterbium, lutetium, elements of groups IVA to IIB having an oxidation number of less than 6, aluminum III, silicon IV, gallium III, germanium IV, indium III, tin IV, phosphorus V, antimony V and bismuth V; and $0 \leq x < 2$; and $0 \leq y < 2$;

at least 30% of the ceramic body characterized by an alpha crystalline structure and disposed as a device for conducting protons at a temperature below 550° C.

Figure 1:
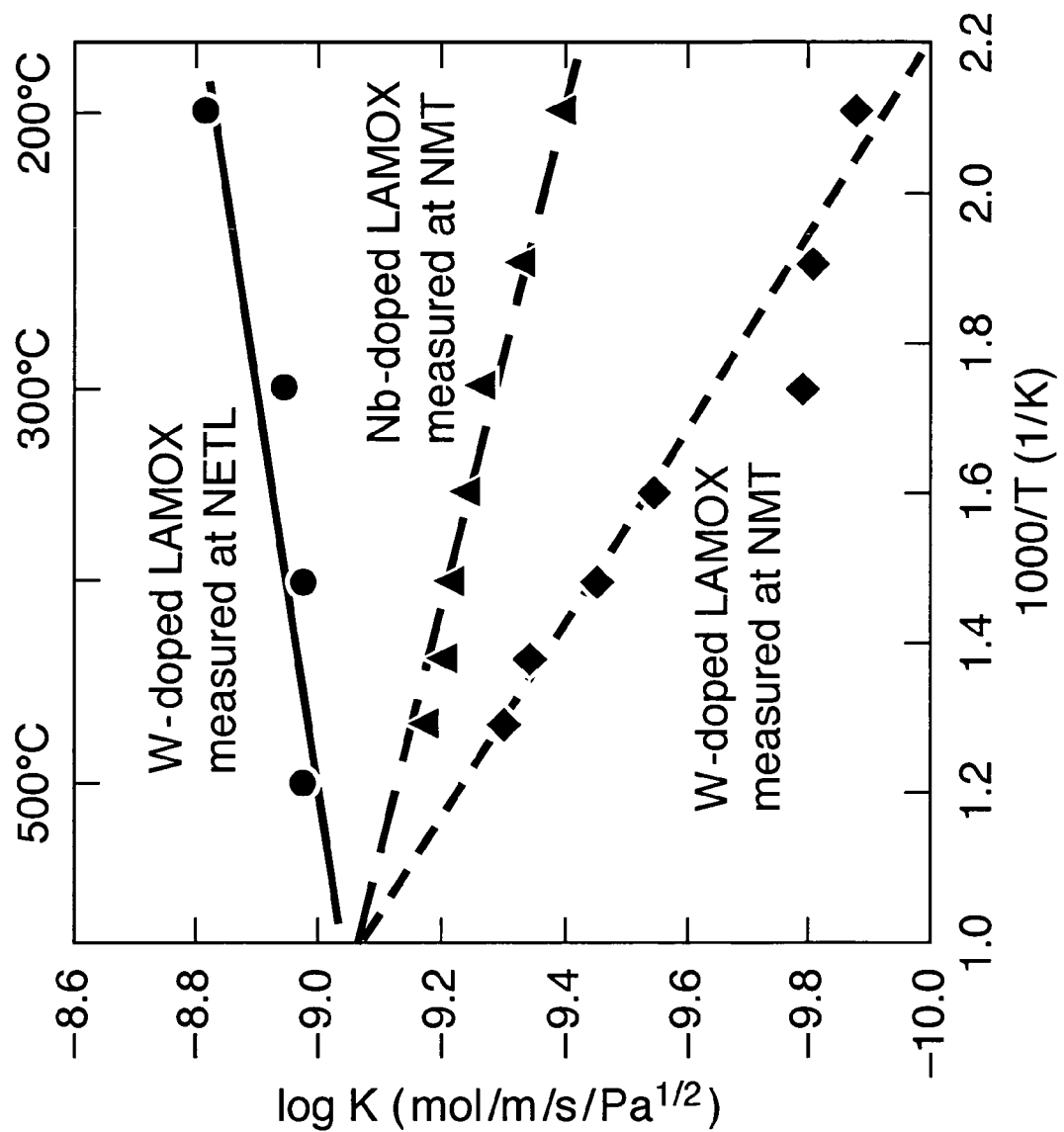
FIG. 1 is a graph showing measured hydrogen permeation in dense doped LAMOX membranes of approximately 2 mm thickness.

For a better understanding of the present invention, together with other and further objects, advantages and capabilities thereof, reference is made to the following disclosure and appended claims in connection with the above-described drawings.

DETAILED DESCRIPTION OF THE INVENTION

The compositions of the present invention are derived from $La_2Mo_2O_9$ and other metal oxides having a pseudo-cubic crystal structure related to beta-$SnWO_4$ described by Goutenoire. The compositions are commonly referred to as LAMOX (Lanthanide metal oxide). LAMOX as used herein is a general term that encompasses all of the chemical compositions defined above in paragraphs 0012-0017 of the Summary of the Invention.

The LAMOX compositions described in U.S. Patent Application No. 20030160216 referenced hereinabove are utilized herein at temperatures in the range of 20° C. to 520° C. where the crystalline structure is an alpha (α) crystalline structure (alpha-phase). At temperatures above 520° C., the crystalline structure of the LAMOX compositions generally converts to a beta (β) crystalline structure (beta-phase), which is undesirable for the practice of the present invention.

In the Goutenoire application it is stated that: "The structure of the compounds of the invention gives them ionic conductive properties, more particular anionic conductive properties. This property has been demonstrated in the parent compound of the compounds of the invention, i.e., $La_2Mo_2O_9$. For this reason, the invention also concerns the use of the compounds described above as ion conductors, and the parent compound cited above."

In contrast to Goutenoire, and in accordance with the present invention, the same LAMOX compositions, upon a heat treatment involving partial reduction at elevated temperatures in humidified hydrogen that modifies the crystalline structure from the beta-phase to the alpha-phase, become protonic conductors at temperatures below 550° C.

The process for making proton-conducting alpha-phase LAMOX entails heating the composition to a temperature in the range of 200-550° C. in gas stream which preferably contains at least 2% hydrogen, at least 1% $H_2O$ vapor, balance inert gas such as Ar, for example. The gas stream preferably contains at least 4% hydrogen and/or at least 3% $H_2O$ vapor.

The conduction mechanism in accordance with the present invention, hydrogen cation diffusion, is distinct from the oxygen anion diffusion mechanism described in the literature. Proton conduction does not occur in the compositions prepared according Goutenoire except upon heat treatment in accordance with the present invention. Prior to heat treatment in accordance with the present invention the compositions are generally white in color, but become black in color upon heat treatment in accordance with the present invention.

LAMOX can be synthesized via solid-state methods or by solution methods (for example, combustion synthesis, coprecipitation, etc). For undoped LAMOX there are two structural polymorphs—a low-temperature alpha-phase and a high temperature beta-phase with a reversible transformation at around 580° C. Doping either cation site will in general lower the transformation temperature. The beta-phase is preferred for oxygen ion conduction as described by Goutenoire.

In contrast to the beta-phase, the alpha-phase has been determined to provide proton conduction, as evidenced by the data shown in FIG. 1, which shows measured hydrogen permeation in dense doped LAMOX membranes of approximately 2 mm thickness. Data was collected during initial heating in humidified hydrogen, and also during cooling in humidified hydrogen. After the initial heating in humidified $H_2$ it is expected that the hydrogen permeance will reversibly follow the upper trace.

Compositions of LAMOX can be formulated to have mixtures of different phases. In order to provide a feasible degree of proton conduction, a LAMOX body should contain at least 30% of the alpha-phase, preferably at least 50% of the alpha-phase, more preferably at least 70% of the alpha-phase, more preferably at least 90% of the alpha-phase, and ideally essentially 100% of the alpha phase.

Doping the LAMOX with at least one appropriate dopant such as W, Nb, and/or Sr, for example, greatly improves the sinterability of ceramic powders compared to undoped LAMOX. The use of such sintering aids does not appear to deleteriously affect the proton conducting properties of the LAMOX.

Dopants Nd, Sm (on the A-site) and Nb, Ta (on the B-site), up to some level, lower the transformation temperature but do not stabilize the beta-phase at room temperature in air. Other dopants on the A-site (Bi, K, Sr, Ba, Gd, Y, Ca) and on the B-site (V, S, Cr, W, Re) stabilize beta-phase at room temperature in air. However, in accordance with the present invention, W-doping on B-site causes the alpha-phase to be stabilized at low to moderate temperatures in the reducing atmospheres necessary for proton conduction, and this is likely true for other dopants as well.

In the presence of hydrogen, the high-temperature beta-phase LAMOX becomes amorphous, whereas the alpha-phase is stable in hydrogen. The amorphous phase should be avoided, as it can degrade the mechanical strength of the ceramic.

As-prepared alpha-phase LAMOX is generally pale yellow in color, whereas upon exposure to hydrogen it becomes black. The color can be changed back to pale yellow by reheating in an oxidizing atmosphere. This color change is not accompanied by a structural transformation and is interpreted to be due to changes in the oxygen vacancy concentration.

Upon heating the proton conducting alpha-phase material above the transformation temperature, the structure transforms to the beta-phase and is no longer a viable proton conductor, since the beta-phase is a fast oxygen ion conductor as described by Goutenoire.

The materials described hereinabove can be applied as (1) an electrolyte material for fuel cells; (2) as an electrolyzer material; (3) a dense membrane for separation of pure hydrogen gas from nearly any source; and (4) a sensor for detection of hydrogen gas concentration. Each of these four applications is discussed hereinbelow in further detail.

In the first case, alpha-LAMOX is a proton-conducting electrolyte for a solid oxide fuel cell. The low temperature operation of the new electrolyte enables the use of metallic electrodes. The anode can be a dense or porous metal provided it conducts protons and electrons (e.g. Pd) or else a porous electron-conducting metal. The cathode similarly can be a dense metal provided it conducts protons and electrons (e.g. Pd) or else a porous electron-conducting metal, stable in an oxidizing atmosphere. This combination can be incorporated in any conventional SOFC geometries, including planar configurations, tubular configurations, and other configurations.

Figure 2:
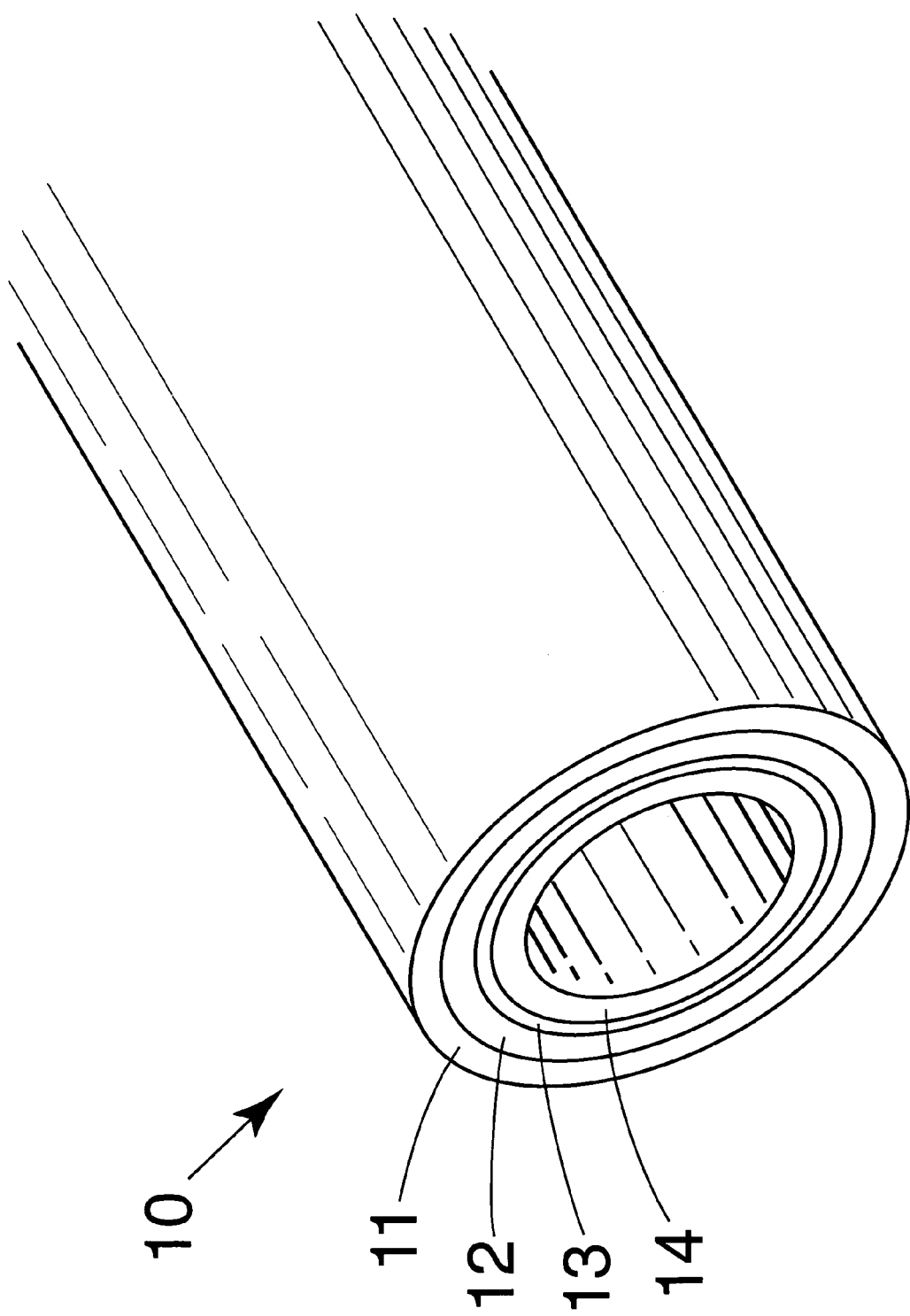
FIG. 2 is an oblique, not-to-scale view of a fuel cell tube having a proton conducting oxide in accordance with the present invention.

For example, the present invention can be utilized in a TSOCF application. Referring to FIG. 2, an example of a TSOFC tube 10 having a circular cross-section is shown. The tube 10 is open on both ends. A porous metal support tube 11 can serve as an anode or can be coated on the inside with a porous anode material 12. The anode 12 is coated on the inside with a dense electrolyte 13 such as a proton-conducting alpha-phase LAMOX in accordance with the present invention. The dense electrolyte 13 is coated on the inside with a porous cathode material 14. The compositions used to make the other TSOFC layers are not critical to the present invention. Moreover, the anode and cathode layers can be interchanged. Moreover, any or all of the various coatings can be applied to the outside of the tube rather than the inside thereof.

Moreover, the present invention can be utilized in a SOCF application wherein various components are arranged in planar, folded, and/or convoluted fashion.

In the second case, alpha-LAMOX is a proton-conducting electrolyte for a solid oxide electrolyzer cell. Such a cell is similar to a fuel cell but is operated in reverse.

In the third case, a dense alpha-LAMOX membrane can be used for hydrogen separation with the same anodes as described hereinabove, or different electrodes. The membrane can be driven by an applied electrical potential, or by a chemical potential (e.g., a $H_2$ partial pressure gradient). The selectivity of such a membrane can approach 100%.

In the fourth case, a hydrogen concentration sensor can be constructed by measuring the electrical potential across a membrane that divides two electrodes, where one side is exposed to a reference atmosphere and the temperature is either held constant or monitored in parallel. Alternatively the electrical resistivity of the alpha-LAMOX can be measured and related to the hydrogen concentration, but this application requires additional humidity and temperature data, and may possibly be affected by other gas species.

Moreover, the compositions of the present invention can be used in virtually any application wherein protonic conduction may be employed.

While there has been shown and described what are at present considered the preferred embodiments of the invention, it will be obvious to those skilled in the art that various changes and modifications can be prepared therein without departing from the scope of the inventions defined by the appended claims.

What is claimed is:

1. A device for conducting protons at a temperature below 550° C. comprising a ceramic body having a chemical formula:

$$A_{2-x}A'_xB_{2-y}B'_yO_{9-\delta}$$

wherein:
a. A consists essentially of at least one trivalent element selected from the group consisting of lanthanum, cerium, praseodymium, neodymium, promethium, samarium, europium, gadolinium, terbium, dysprosium, holmium, erbium, thulium, ytterbium, lutetium, actinium, thorium, protactinium, uranium, bismuth, antimony, and arsenic;
b. A' consists essentially of at least one element selected from the group consisting of monovalent lithium, monovalent sodium, monovalent potassium, monovalent rubidium, monovalent cesium, monovalent francium, divalent beryllium, divalent magnesium, divalent calcium, divalent strontium, divalent barium, divalent radium, divalent tin, divalent lead, divalent samarium, divalent europium, divalent erbium, divalent thulium divalent ytterbium, quadrivalent thorium, quadrivalent uranium, quadrivalent titanium, quadrivalent zirconium, quadrivalent hafnium, quadrivalent thorium, quadrivalent cerium, quadrivalent praseodymium, and quadrivalent terbium;
c. B consists essentially of at least one element selected from the group consisting of hexavalent chromium, hexavalent molybdenum, hexavalent tungsten, hexavalent uranium, hexavalent manganese, hexavalent technetium, hexavalent rhenium, hexavalent iron, hexavalent cobalt, hexavalent nickel, hexavalent ruthenium, hexavalent rhodium, hexavalent palladium, hexavalent osmium, hexavalent iridium, hexavalent platinum, hexavalent sulfur, hexavalent selenium, hexavalent tellurium, and hexavalent polonium;
d. B' consists essentially of at least one element selected from the group consisting of lithium, sodium, magnesium, calcium, scandium, yttrium, europium, gadolinium, terbium, dysprosium, holmium, erbium, thulium, ytterbium, lutetium, elements of groups IVA to IIB having an oxidation number of less than 6, aluminum III, silicon IV, gallium III, germanium IV, indium III, tin IV, phosphorus V, antimony V and bismuth V; and
e. $0 \leq x < 2$ and $0 \leq y < 2$;
at least 30% of said ceramic body characterized by an alpha crystalline structure, said ceramic body disposed as a device for conducting protons at a temperature below 550° C.

2. A device in accordance with claim 1 wherein at least 50% of said ceramic body is characterized by an alpha crystalline structure.

3. A device in accordance with claim 2 wherein at least 70% of said ceramic body is characterized by an alpha crystalline structure.

4. A device in accordance with claim 3 wherein at least 90% of said ceramic body is characterized by an alpha crystalline structure.

5. A device in accordance with claim 1 further comprising at least one of the group consisting of a fuel cell, an electrolyzer, a hydrogen gas separator, and a hydrogen sensor.

6. A process for making a device for conducting protons at a temperature below 550° C. comprising the steps of:
a. Providing a ceramic body having a chemical formula:

$$A_{2-x}A'_xB_{2-y}B'_yO_{9-\delta}$$

wherein:
(1) A consists essentially of at least one trivalent element selected from the group consisting of lanthanum, cerium, praseodymium, neodymium, promethium, samarium, europium, gadolinium, terbium, dysprosium, holmium, erbium, thulium, ytterbium, lutetium, actinium, thorium, protactinium, uranium, bismuth, antimony, and arsenic;
(2) A' consists essentially of at least one element selected from the group consisting of monovalent lithium, monovalent sodium, monovalent potassium, monovalent rubidium, monovalent cesium, monovalent francium, divalent beryllium, divalent magnesium, divalent calcium, divalent strontium, divalent barium, divalent radium, divalent tin, divalent lead, divalent samarium, divalent europium, divalent erbium, divalent thulium divalent ytterbium, quadrivalent thorium, quadrivalent uranium, quadrivalent titanium, quadrivalent zirconium, quadrivalent hafnium, quadrivalent thorium, quadrivalent cerium, quadrivalent praseodymium, and quadrivalent terbium;
(3) B consists essentially of at least one element selected from the group consisting of hexavalent chromium, hexavalent molybdenum, hexavalent tungsten, hexavalent uranium, hexavalent manganese, hexavalent technetium, hexavalent rhenium, hexavalent iron, hexavalent cobalt, hexavalent nickel, hexavalent ruthenium, hexavalent rhodium, hexavalent palladium, hexavalent osmium, hexavalent iridium, hexavalent platinum, hexavalent sulfur, hexavalent selenium, hexavalent tellurium, and hexavalent polonium;
(4) B' consists essentially of at least one element selected from the group consisting of lithium, sodium, magnesium, calcium, scandium, yttrium, europium, gadolinium, terbium, dysprosium, holmium, erbium, thulium, ytterbium, lutetium, elements of groups IVA to IIB having an oxidation number of less than 6, aluminum III, silicon IV, gallium III, germanium IV, indium III, tin IV, phosphorus V, antimony V and bismuth V; and
(5) $0 \leq x < 2$ and $0 \leq y < 2$; and
b. heating the composition to a temperature in the range of 200-550° C. in gas stream comprising at least 2% hydrogen, at least 1% $H_2O$ vapor, balance inert gas.

7. A process in accordance with claim 6 wherein said gas stream comprises at least 4% hydrogen.

8. A process in accordance with claim 6 wherein said gas stream comprises at least 3% $H_2O$ vapor.

9. A process in accordance with claim 6 wherein said inert gas comprises Ar.